(12) United States Patent
Ellis, Jr.

(10) Patent No.: US 12,140,160 B2
(45) Date of Patent: Nov. 12, 2024

(54) METHODS AND APPARATI FOR QUICKSET GAS LIFT SEPARATION AND LIQUID STORAGE

(71) Applicant: LIFTROCK LLC, Granbury, TX (US)

(72) Inventor: Billy Joe Ellis, Jr., Granbury, TX (US)

(73) Assignee: LIFTROCK LLC, Granbury, TX (US)

( * ) Notice: Subject to any disclaimer, the term of this patent is extended or adjusted under 35 U.S.C. 154(b) by 0 days.

(21) Appl. No.: 17/890,778

(22) Filed: Aug. 18, 2022

(65) Prior Publication Data

US 2023/0184264 A1 Jun. 15, 2023

Related U.S. Application Data

(63) Continuation of application No. 17/670,251, filed on Feb. 11, 2022, now Pat. No. 11,466,703, which is a continuation of application No. 17/239,126, filed on Apr. 23, 2021, now Pat. No. 11,255,349, which is a continuation of application No. 16/706,284, filed on Dec. 6, 2019, now abandoned, which is a continuation of application No. 16/565,081, filed on Sep. 9, 2019, now Pat. No. 10,519,983, which is a continuation of application No. PCT/US2019/036625, filed on Jun. 11, 2019.

(60) Provisional application No. 62/683,209, filed on Jun. 11, 2018.

(51) Int. Cl.
*E21B 43/12* (2006.01)
*B01D 45/00* (2006.01)
*E21B 34/06* (2006.01)
*E21B 34/16* (2006.01)
*F04F 1/20* (2006.01)

(52) U.S. Cl.
CPC ................ *F04F 1/20* (2013.01); *B01D 45/00* (2013.01); *E21B 34/06* (2013.01); *E21B 34/16* (2013.01); *E21B 43/122* (2013.01); *E21B 43/123* (2013.01); *E21B 43/126* (2013.01)

(58) Field of Classification Search
CPC . F04F 1/20; B01D 45/00; E21B 34/06; E21B 34/16; E21B 43/122; E21B 43/123; E21B 43/126
See application file for complete search history.

(56) References Cited

U.S. PATENT DOCUMENTS 2,895,305 A * 7/1959 Reed .......................... F17C 7/02
62/48.2

* cited by examiner

*Primary Examiner* — Robert A Hopkins
(74) *Attorney, Agent, or Firm* — Barnes & Thornburg LLP; Steven D. Shipe (57) ABSTRACT

The present disclosure provides methods and apparati for separating liquids from production gases and recovering the liquids. The methods and apparati of the present disclosure can reduce or eliminate emissions compared to standard methods and devices and also eliminate the need for haul away of liquids by collecting compressor system liquids in charge vessel(s). The methods and apparati of the present disclosure can also be used to fuel the engines which operate the compressor systems using gas from the compressor drains and the gas used to drain the charge vessel(s).

14 Claims, 8 Drawing Sheets

METHODS AND APPARATI FOR QUICKSET GAS LIFT SEPARATION AND LIQUID STORAGE

CROSS-REFERENCE TO RELATED APPLICATIONS

The present application is a continuation of U.S. application Ser. No. 17/670,251, filed Feb. 11, 2022, the entire contents of which is hereby incorporated herein by reference. U.S. application Ser. No. 17/670,251, filed Feb. 11, 2022, is a continuation of U.S. patent application Ser. No. 17/239,126, filed Apr. 23, 2021, the entire contents of which is hereby incorporated herein by reference. U.S. application Ser. No. 17/239,126 is a continuation of U.S. application Ser. No. 16/706,284, filed Dec. 6, 2019, the entire contents of which are hereby incorporated herein by reference. U.S. application Ser. No. 16/706,284 is a continuation of U.S. patent application Ser. No. 16/565,081, filed Sep. 9, 2019, now U.S. Pat. No. 10,519,986, which is a continuation of International Patent Application No. PCT/US2019/036625, filed Jun. 11, 2019, which claims priority to U.S. Provisional Application No. 62/683,209, filed Jun. 11, 2018, the disclosure of each of which is incorporated herein by reference in its entirety.

BACKGROUND

In the oil and gas industry, gas lift technology uses an external source of high-pressure gas for supplementing formation gas to lift well fluids. Typically, in the production of oil from oil wells by gas lift systems, gas separated from the oil is compressed by a compressor to increase its pressure and recycled for further production of oil. After the compression stage, the gas is returned to the production wells as gas lift gas. In typical gas lift systems, fluids produced from the separation process are routed into haul off tanks on the surface. The fluids from the haul off tanks are collected by haul off trucks. Every time the fluids from the separation process are released to the haul off tanks during a dump cycle, gas emissions are released into the atmosphere. Further liquids that are stored in the haul off tanks continually turn to vapor, releasing gas emissions to the atmosphere.

It is desirable to have methods and apparati configured for gas lift separation and fluid storage which reduce or eliminate atmospheric emissions and the need for haul off trucks.

SUMMARY

The present disclosure provides methods and apparati for quickset gas lift separation and liquid storage.

In some embodiments, an apparatus is provided that comprises an inlet separator configured to receive production gas and to separate entrained liquids from the production gas to form a gas lift gas, the inlet separator the can include a production gas inlet, a gas lift gas outlet configured to be fluidically connected to a compressor system comprising at least one engine capable of being operated using the gas lift gas as fuel, and a liquid outlet as well as a first charge vessel that can include a first liquid inlet fluidically connected to the liquid outlet of the inlet separator, a first charge gas valve configured to be fluidically connected to a high pressure gas source in the compressor system and further configured to deliver high pressure gas to drain the first charge vessel when the first charge gas valve is in an open configuration, a liquid outlet fluidically connected to a first dump valve, the first dump valve allowing liquid from the first charge vessel to flow out of the first charge vessel when the first dump valve is in an open position and preventing the flow of liquid from the first charge vessel when the first dump valve is in a closed position, and a gas outlet configured to be fluidically connected to the at least one engine.

In some embodiments, a method for recovering lift gas lift gas and liquids from production gas can include feeding a production gas to an inlet separator fluidically connected to a first charge vessel configured to receive liquids, the inlet separator being configured to remove liquids from the production gas and deliver the liquids to the first charge vessel and to generate a gas lift gas, the inlet separator being further fluidically connected to a compressor system comprising at least one engine and configured to deliver gas lift gas to the compressor system, and the step of allowing gas lift gas from the first charge vessel to flow into the at least one engine in the compressor system, the first charge vessel comprising a gas outlet fluidically connected to the at least one engine, the gas lift gas being suitable to operate the at least one engine.

In some embodiments, an apparatus can include an inlet separator configured to receive production gas and to separate entrained liquids from the production gas to form a gas lift gas, the inlet separate can include a production gas inlet, a gas lift gas outlet configured to be fluidically connected to a compressor system and a liquid outlet, and a first charge vessel that can include at least one liquid inlet fluidically connected to the liquid outlet of the inlet separator, at least one of the at least one liquid inlet being configured to be fluidically connected to the compressor system to receive liquids from the compressor system, a first charge gas valve configured to be fluidically connected to a high pressure gas source in the compressor system and further configured to deliver high pressure gas to drain the first charge vessel when the first charge gas valve is in an open configuration, a liquid outlet fluidically connected to a first dump valve, the first dump valve allowing liquid from the first charge vessel to flow out of the first charge vessel when the first dump valve is in an open position and preventing the flow of liquid from the first charge vessel when the first dump valve is in a closed position, and a gas outlet configured to be fluidically connected to the compressor system.

In some embodiments, a method for recovering gas lift gas and liquids from production gas can include feeding a production gas to an inlet separator fluidically connected to a first charge vessel configured to receive the liquids, the inlet separator being configured to remove liquids from the production gas and deliver the liquids to the first charge vessel and to generate a gas lift gas, the inlet separator being further fluidically connected to a compressor system and configured to deliver gas lift gas to the compressor system, and allowing liquids generated by the compressor system to flow into the first charge vessel, the first charge vessel being configured to be fluidically connected to the compressor system.

In some embodiments, an apparatus of the present disclosure includes a fuel filter comprising a gas inlet, a liquid outlet, and a gas outlet configured to be fluidically connected to at least one engine capable of being operated using a gas lift gas as fuel in a compressor system, the fluidic connection between the gas outlet and the at least one engine including a pressure control valve configured to allow a suitable pressure of gas lift gas to the at least one engine to operate the at least one engine, an inlet separator configured to receive production gas and to separate entrained liquids from the production gas to form the lift gas, the inlet separator including a production gas inlet, a gas lift gas outlet configured to be fluidically connected to the compressor system, a liquid outlet, a gas make up outlet fluidically connected to the fuel filter, the fluid connection between the gas make up outlet and the fuel filter including a fuel gas make up valve, the fuel gas make up valve being configured to allow sufficient gas lift gas to flow from the inlet separator to the fuel filter to maintain a pressure suitable to operate the at least one engine, and a gas charge outlet fluidically connected to the fuel filter, the fluidic connection between the gas charge outlet and the fuel filter comprising a fuel filter charge valve configured to deliver gas lift gas to the fuel filter to drain liquids form the fuel filter when the fuel filter charge valve is in an open configuration, and a first charge vessel that can include at least one liquid inlet fluidically connected to the liquid outlet of the inlet separator and the liquid outlet of the fuel filter, at least one of the at least one liquid inlet being configured to be fluidically connected to the compressor system to receive liquids from the compressor system, a gas de pressure outlet fluidically connected to the inlet separator, the fluidic connection between the gas de pressure outlet and the inlet separator comprising a de pressure valve, a first charge gas valve configured to be fluidically connected to a high pressure gas source in the compressor system and further configured to deliver high pressure gas to drain the first charge vessel when the first charge gas valve is in an open configuration and the de pressure valve is in a closed configuration, a liquid outlet fluidically connected to a first dump valve, the first dump valve allowing liquid from the first charge vessel to flow out of the first charge vessel when the first dump valve is in an open configuration and preventing the flow of liquid from the first charge vessel when the first dump valve is in a closed configuration, and a gas outlet fluidically connected to the fuel filter and configured to deliver gas lift gas to the fuel filter to operate the at least one engine.

In some embodiments, a method for recovering gas lift gas and liquids from production gas can include feeding a production gas to an apparatus of the present disclosure.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein.

DESCRIPTION

While methods, systems and devices are described herein by way of examples and embodiments, those skilled in the art recognize the methods, systems and devices are not limited to the embodiments or drawings described. It should be understood that the drawings and description are not intended to be limited to the particular form disclosed. Rather, the intention is to cover all modifications, equivalents and alternatives falling within the spirit and scope of the appended claims and description. Any headings used herein are for organization purposes only and are not meant to limit the scope of the description of the claims. As used herein, the word "may" is used in a permissive sense (i.e., meaning having the potential to) rather than the mandatory sense (i.e., meaning must). Similarly, the words "include," "including," and "includes" mean including, but not limited to. The present disclosure describes particular embodiments and with reference to certain drawings, but the subject matter is not limited thereto.

The present disclosure will provide description to the accompanying drawings, in which some, but not all embodiments of the subject matter of the disclosure are shown. Indeed, the subject matter may be embodied in many different forms and should not be construed as limited to the embodiments set forth herein, rather, these embodiments are provided so that this disclosure satisfies all the legal requirements.

The basic components of certain embodiments are described herein. As used in the description, the terms "top," "bottom," "above," "below," "over," "under," "beneath," "on top," "underneath," "up," "down," "upper," "lower," "front," "rear," "back," "forward" and "backward" refer to the objects referenced when in the orientation illustrated in the drawings, which orientation is not necessary for using the devices or achieving the methods described herein.

Definitions

Certain terminology is used in the following description for convenience only and is not limiting. Certain words used herein designate directions in the drawings to which reference is made. Unless specifically set forth herein, the terms "a," "an" and "the" are not limited to one element, but instead should be read consistent with the meaning of "one or more," "at least one." and "one or more than one." As used herein "another" means at least a second or more. The terminology includes the words noted above, derivatives thereof and words of similar import.

The use of the term "or" in the claims is used to mean "and/or" unless explicitly indicated to refer to alternatives only or the alternatives are mutually exclusive.

Use of the term "about", when used with a numerical value, is intended to include +/−10%. For example, if a number of amino acids is identified as about 200, this would include 180 to 220 (plus or minus 10%).

"Fluidically connected" as used herein refers to a physically connected state, such as, by way of example but not limitation, by interconnected piping, which permits the flow of a fluid, which can include either a liquid or gas or both.

Unless otherwise defined, all technical and scientific terms used herein have the same meaning as commonly understood by one of ordinary skill in the art.

The present disclosure generally relates to methods and apparati for processing production gas to separate out and recycle gas lift gas for use in obtaining oil from wells and for separating an obtaining fluids from the production gas and gas lift gas while it is processed in the compressor package.

Figure 1:
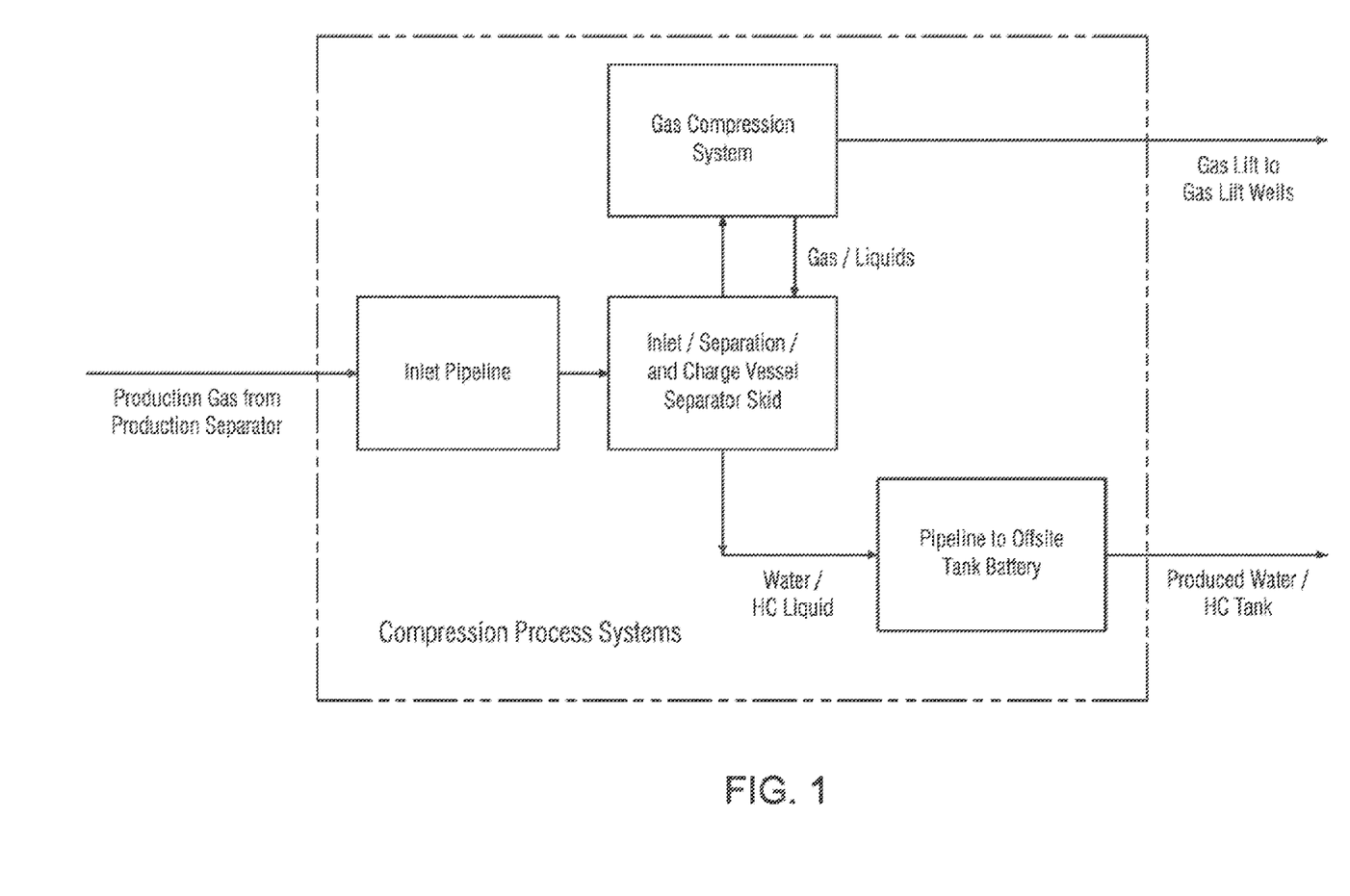
FIG. 1 is an exemplary schematic view of the overall facility of an embodiment of the present disclosure.
Figure 2:
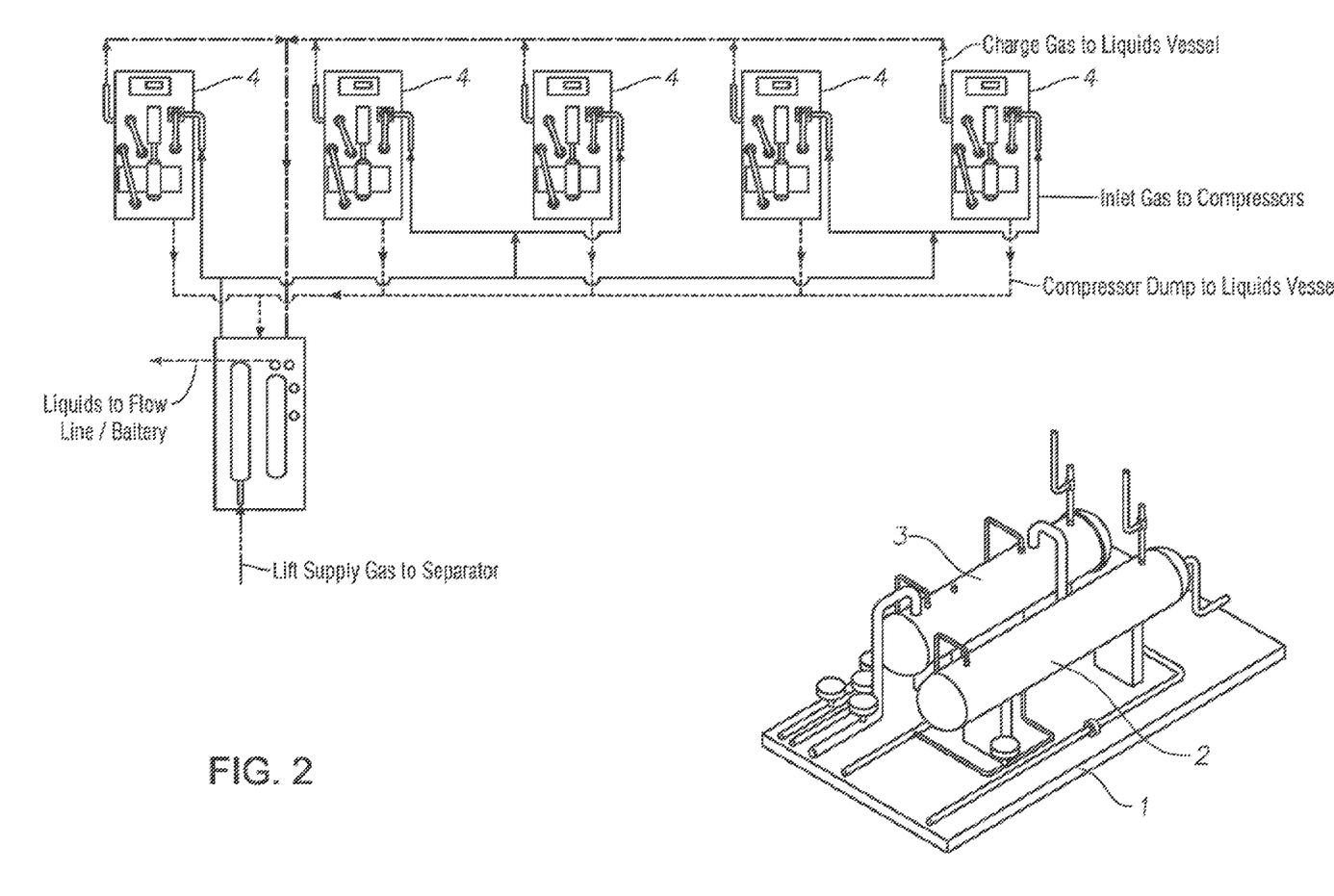
FIG. 2 depicts another schematic view of the overall facility of the embodiment shown in FIG. 1.

As shown in FIG. 1, a general workflow of the processing of production gas according to the present disclosure is shown. FIG. 2 depicts the workflow in FIG. 1 using five gas compression systems connected to a single gas lift quickset skid 1. The gas lift quickset skid can include the inlet separator 2 and the charge vessel 3. As shown in FIGS. 1 and 2, production gas can be received along an inlet pipeline into the gas lift quickset skid, which can be mobile. The gas lift quickset skid includes the inlet for introducing the production gas into an inlet separator which can separate entrained liquids from the production gas, the entrained liquids being stored in a charge vessel. The gas lift quickset skid is fluidically connected to a gas compression system where the gas lift gas separated from the production gas is compressed for recycling for use in obtaining oil from the well. Gas lift gas from the inlet separator can be metered on the quickset skid before being discharged into the gas compression system 4 where it is compressed to high pressures. Additional metering skids and compression skids can be used to provide for parallel compressor operations. The fluidic connections between the gas lift quicket skid and the gas compression system can allow for the flow of gas and liquids between the two, as liquids can be produced by the gas compression system which are undesirable in the final gas lift gas for use in the well. Because liquids are produced in the process of gas compression, these liquids can be separated by scrubbers in the compression system and can be dumped to the charge vessel. By diverting the liquids from the compressor system to the charge vessel, these liquids can be combined with those from the inlet separator and dumped from the charge vessel for subsequent use or storage. When the liquid in the charge vessel reaches a certain level, charge gas from the gas compression systems can be used to drive the liquid out of the charge vessel and to a flow line or tank battery. For example, charge gas from a second interstage scrubber of the gas compression system can be used to drive liquids out of the charge vessel. The pressurized gas will displace the accumulated liquids from the charge vessel for some short time interval and the charge vessel will depressurize and again return to normal operation. As an alternative, a pneumatic or electrically driven pump may be provided to pump liquids from the charge vessel if liquid supply pressure in the liquid line is required. The separated liquids can then flow via a pipeline to an offsite tank battery. The gas lift quicket skid can also allow loading and unloading via winch truck and rolling tailboard.

Figure 3:
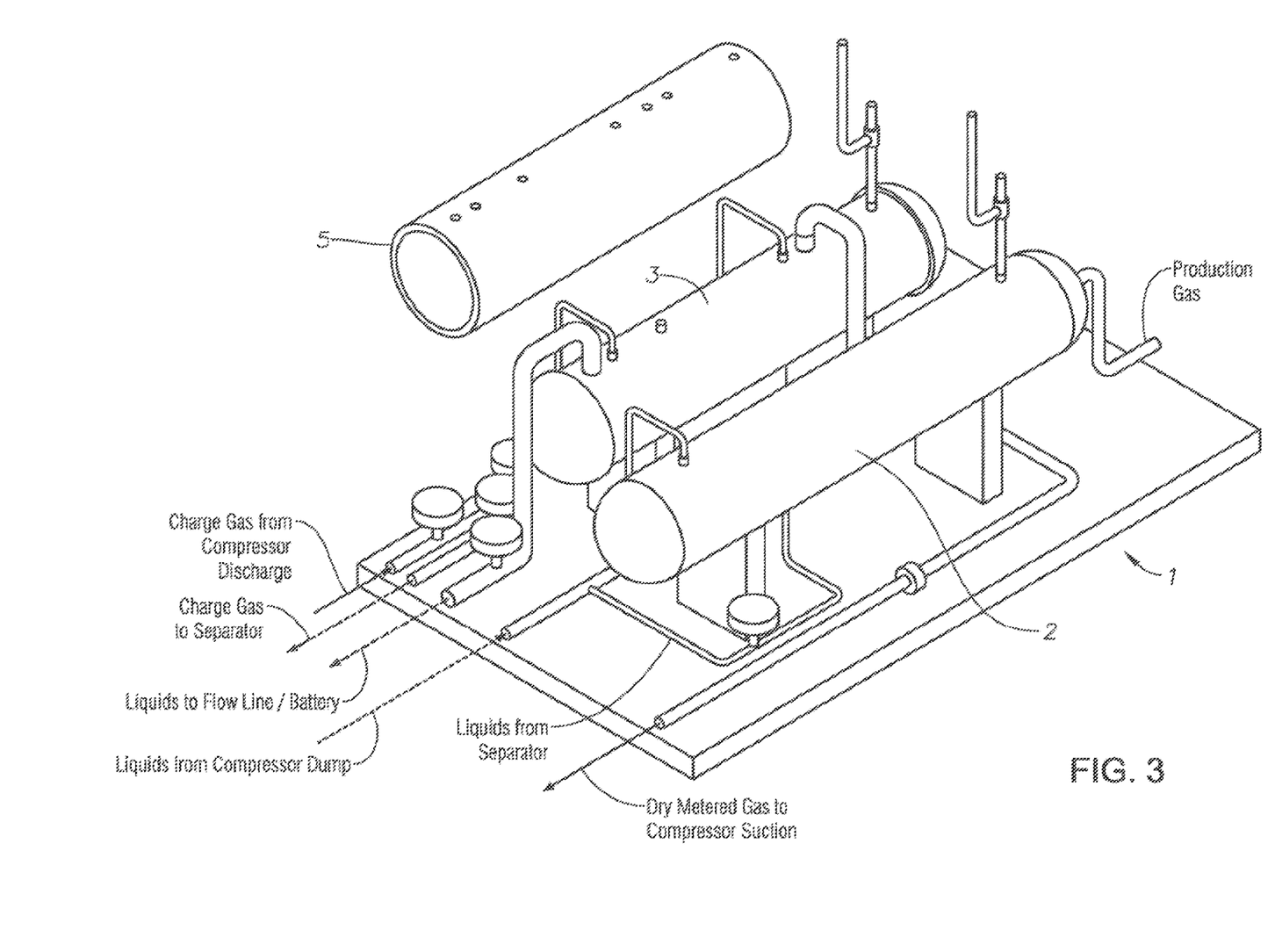
FIG. 3 depicts a perspective view of an exemplary gas lift quicket skid.

As shown in FIG. 3, an exemplary gas lift quickset skid 1 can include an inlet separator 2 and a charge vessel 3. The charge vessel can also be insulated with charge vessel insulation 5.

Production fluids from oil or gas wells will typically be processed at a central production facility from which some of the separated process gas will be transferred via pipeline to the gas lift skid. The gas lift skid may be located at a considerable distance from the production facility where process gas is being transferred from via pipeline in some installations. The supply gas arrival temperature at the quickset skid will vary and gas typically will arrive at ambient conditions. The gas supply pressure can vary from, by way of example but not limitation, 15 psig to 250 psig. The inlet separator located on the quickset skid removes entrained liquids from the gas before the gas is transferred to an adjacent compressor skid, generally provided by others. A multistage gas engine driven reciprocating compressor located on the adjacent skid can compress the gas, by way of example, but not limitation, about 1000 to 1500 psig, where the discharge gas will be returned to the oil or gas wells for use as gas lift gas. A slip stream taken from the compressor inlet scrubber or charge gas separator can be used as fuel gas in the compressor gas engine. Utility gas from the compressor interstage scrubber(s) can also return to the quickset skid and can be used to displace the accumulated liquids from the charging vessel to a remote tank farm storage facility.

Figure 4:
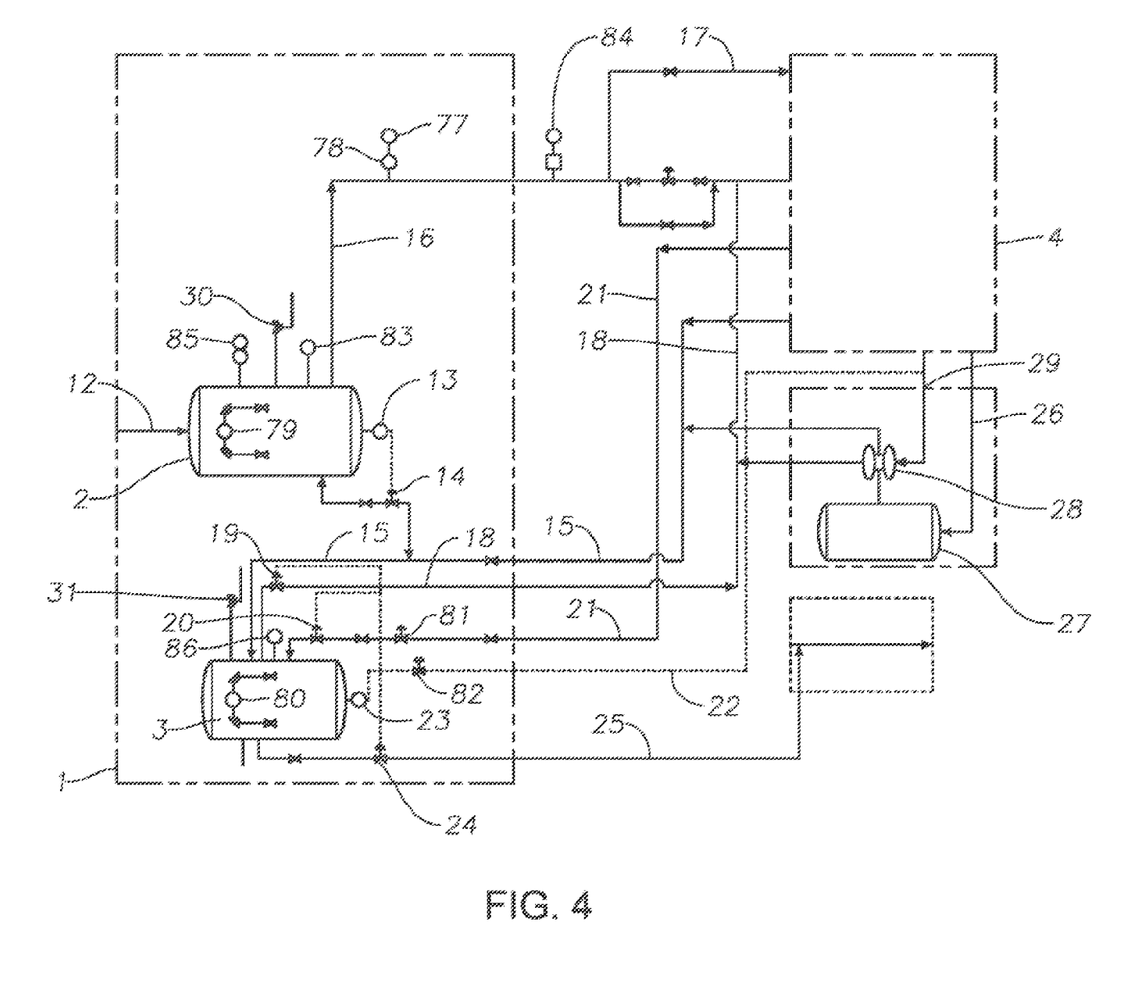
FIG. 4 depicts an exemplary apparatus of the present disclosure.
Figure 7:
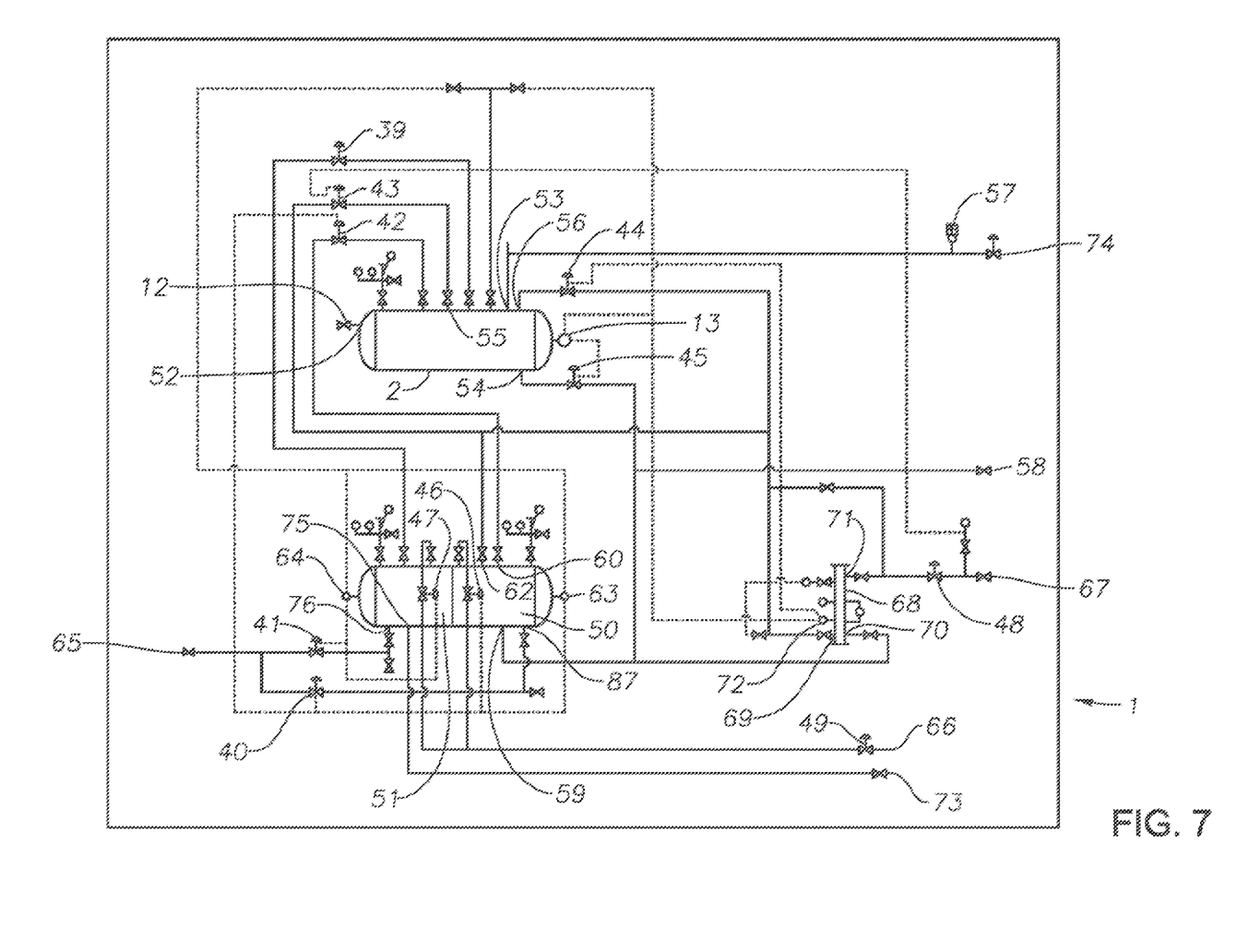
FIG. 7 depicts another exemplary apparatus of the present disclosure.

The inlet separator can be a horizontal vessel that facilitates removal of liquids from the production gases. Inlet separators are known to those of skill in the art. The liquids from the inlet separator can be discharged under level control and sent to a charge vessel. The charge vessel can store liquids from both the inlet separator and the adjacent compressor interstage scrubbers. Liquids from the charge vessel can periodically discharge to the storage facility which typically may be located a mile from the quickset skid. The pressure in the charge vessel can be increased, by way of example but not limitation up to 180 psig, while liquids are being discharged to the tank farm. Isolation valves and check valves can be used to prevent gas discharge to the other flow lines while the charge vessel is pressurized with high pressure gas as shown in FIGS. 4 and 7. Gas from the charge vessel can normally recycle to the inlet separator or provide fuel gas to the compressor gas engines.

To prevent and control algae and other organic growth in the liquid lines downstream of the charge vessel, the injection of suitable chemicals can be provided. The buildup of any growth in the discharge pipeline can be determined by monitoring the pressure drop in the discharge piping which could significantly increase over time during normal operation.

The quickset skid can collect critical information and measurements and provide early warning to operators of potential or developing problems. The control and safety system devices can employ a combination of pneumatic, electrical and wireless technology to provide the desired functionality.

In some embodiments, an apparatus is provided which comprises an inlet separator and a first charge vessel. The inlet separator is configured to receive production gas through a production gas inlet and to separate entrained liquids from the production gas to form a gas lift gas. The inlet separator is fluidically connected to the first charge vessel via a liquid outlet on the inlet separator and a liquid inlet on the first charge vessel. The inlet separator is also configured to be fluidically connected to a compressor system via a gas lift gas outlet. The first charge vessel also includes a liquid outlet and a first charge gas valve that is configured to be fluidically connected to a high pressure gas source in the compressor system and further configured to deliver high pressure gas to drain the first charge vessel by applying the high pressure gas to the liquid in the first charge vessel.

In some embodiments, the fluidic connection between the inlet separator and the first charge vessel comprises an inlet separator dump valve, the inlet separator dump valve being configured to allow liquid to flow from the inlet separator to the first charge vessel when the inlet separator dump valve is in a first ("open") configuration and prevent the flow of liquid to the first charge vessel when the inlet separator dump valve is in a second ("closed") configuration. In some embodiments, the inlet separator dump valve can be operatively connected to an inlet separator level controller that is also operatively connected to the inlet separator. In some embodiments, the inlet separator level controller and inlet separator dump valve can be fluidically connected to the inlet separator such that they receive supply gas from the inlet separator sufficient to operate the inlet separator level controller and inlet separator dump valve. In some embodiments, the inlet separator level controller is configured to open the inlet separator dump valve when a liquid level in the inlet separator exceeds an inlet separator target liquid level, and is also configured to close the inlet separator dump valve when the liquid level in the inlet separator is less than the inlet separator target liquid level or below a minimum inlet separator liquid level. The inlet separator target liquid level and the minimum inlet separator liquid level can be determined by one of skill in the art depending on the design of the inlet separator and the first charge vessel.

In some embodiments, the liquid outlet of the first charge vessel is fluidically connected to a first dump valve that is configured to allow liquids from the first charge vessel to flow out of the first charge vessel when the first dump valve is in a first ("open") configuration and to prevent the flow of liquid from the first charge vessel when the first dump valve is in a second ("closed") position. In some embodiments, the first dump valve and the first charge valve are operatively connected to a first charge vessel level controller that is operatively connected to the first charge vessel. The first charge vessel level controller, first charge gas valve and first dump valve can be fluidically connected to the inlet separator such that they receive supply gas from the inlet separator sufficient to operate the first charge vessel level controller, first charge gas valve and first dump valve. In some embodiments, the first charge vessel can further comprise a gas de pressure outlet fluidically connected to the inlet separator. In some embodiments, the fluidic connection between the gas de pressure outlet and the inlet separator can include a de pressure valve. In such embodiments, the first charge vessel level controller can be further operatively connected to the de pressure valve and the de pressure valve can be fluidically connected to the inlet separator such that it receives supply gas from the inlet separator sufficient to operate the de pressure valve. In some embodiments, the first charge vessel level controller can be configured to open the first dump valve and first charge valve and, if present, close the de pressure valve when a liquid level in the inlet separator exceeds an inlet separator target liquid level, and can also be configured to close the first charge valve and first dump valve and to open the de pressure valve, if present, when the liquid level in the first charge vessel is less than the first charge vessel target liquid level or below a minimum first charge vessel liquid level. The first charge vessel target liquid level and the minimum first charge vessel liquid level can be determined by one of skill in the art depending on the design of the first charge vessel.

In some embodiments, the first charge vessel can include a gas outlet configured to be fluidically connected to at least one engine in the compressor system, the at least one engine being capable of being operated using the gas lift gas. In some embodiments, the apparatus can further comprise a fuel filter that can include a gas inlet fluidically connected to the gas outlet of the first charge vessel, a liquid outlet, and a gas outlet that is configured to be fluidically connected to the at least one engine. In some embodiments, the fluidic connection between the gas outlet of the fuel filter and the at least one engine can include a pressure control valve configured to allow a suitable pressure of gas lift gas to the at least one engine to operate the at least one engine. In some embodiments, the fluidic connection between the pressure control valve and the at least one engine can include a pressure sensor configured to detect a pressure to the at least one engine, where the inlet separator further comprises a gas make up outlet fluidically connected to the fuel filter, the fluid connection between the gas make up outlet and the fuel filter comprising a fuel gas make up valve operatively connected to the pressure sensor, the pressure sensor being configured to open or close the gas make up valve sufficiently to deliver a suitable pressure of gas lift gas to the at least one engine to operate the at least one engine, where the fuel gas make up valve is configured to allow sufficient gas lift gas to flow from the inlet separator to the fuel filter to maintain a pressure suitable to operate the at least one engine. Thus, for example, where the gas pressure from the first charge vessel that flows through the fuel filter is too low to maintain operation of the at least one engine, the fuel gas flow to the at least one engine can be supplemented with gas flow from the inlet separator. This configuration, where gas is transferred from the first charge vessel to the at least one engine can also assist in de pressurizing the first charge vessel which can aid in the flow of liquids into the first charge vessel, especially where those liquids are at a pressure below that which is typically in the first charge vessel without the de pressurization.

In some embodiments, where a fuel filter is included, the inlet separator can further include a gas charge outlet fluidically connected to the fuel filter, the fluidic connection between the gas charge outlet and the fuel filter including a fuel filter charge valve that can be configured to deliver a gas lift gas to the fuel filter to drain liquids from the fuel filter when the fuel filter charge valve is in an "open" configuration. In some embodiments, the liquid drain from the fuel filter can flow from the liquid outlet of the fuel filter into the first charge vessel to capture the liquids. In some embodiments, the fuel filter can be operatively connected to a fuel filter level controller that is operatively connected to the fuel filter charge valve. The fuel filter level controller and fuel filter charge valve can be fluidically connected to the inlet separator to receive supply gas for their operation. In some embodiments, the fuel filter level controller can be configured to open the fuel filter charge valve when a liquid level in the fuel filter exceeds a fuel filter target liquid level and can be configured to close the fuel filter charge valve when the liquid level in the fuel filter is less than the fuel filter target liquid level or a minimum fuel filter liquid level. The fuel filter target liquid level and minimum fuel filter liquid level can be determined by one of skill in the art based on the design of the fuel filter.

In some embodiments, the first liquid inlet or an additional inlet of the first charge vessel can be configured to be fluidically connected to the compressor system to receive liquids from the compressor system. In some embodiments, the liquids from the compressor system can be from a source chosen from a fuel filter, an inlet or suction scrubber, an interstage scrubber or environmental drains of the compressor system. In some instances, where the pressure in the first charge vessel is higher than the environmental drains or other liquid flows from the compressor system, the apparatus can further include a drain drum and a drain pump, the drain drum being fluidically connected to the drains from the compressor system and the drain pump being fluidically connected to a gas source from the compressor that is at a higher pressure than the first charge vessel such as, by way of example but not limitation, an interstage scrubber such as the second interstage scrubber.

In any of the foregoing embodiments, the apparatus can further comprise a flow meter or device fluidically connected to the gas lift gas outlet, the flow meter or device configured to measure the flow rate of gas or to limit the flow of gas to the compressor system. In any of the foregoing embodiments, the apparatus can also further comprise a second charge vessel that includes at least one liquid inlet configured to be fluidically connected to the compressor system to receive liquids from the compressor system, a second charge gas valve configured to be fluidically connected to the high pressure gas source in the compressor system to deliver high pressure gas to drain the second charge vessel when the second charge gas valve is in an open configuration, and a liquid outlet fluidically connected to a second dump valve, the second dump valve allowing liquid from the second charge vessel to flow out when the second dump valve is in a first ("open") configuration and to prevent the flow of liquid when the second ump valve is in a second ("closed") configuration. In some embodiments, the second charge vessel is configured to receive liquids from the second interstage scrubber of the compressor system. In some embodiments, the second charge vessel can be operatively connected to a second charge vessel level controller that is operatively connected to the second charge gas valve and the second dump valve. The second charge vessel level controller, second charge gas valve and the second dump valve can be fluidically connected to the inlet separator to receive supply gas for their operation. In some embodiments, the second charge vessel level controller is configured to open the second charge gas valve and open the second dump valve when a liquid level in the second charge vessel exceeds a second charge vessel target liquid level and to close the second charge gas valve and the second dump valve when the liquid level in the second charge vessel is less than the second charge vessel target liquid level or a minimum second charge vessel liquid level. The second charge vessel target liquid level and minimum second charge vessel liquid level can be determined by one of skill in the art based on the design of the second charge vessel. In some embodiments, the second charge vessel can be fluidically connected to a charge vessel pressure regulator fluidically connected to the second charge vessel and the inlet separator, that is configured to relieve excess pressure in the second charge vessel.

In any of the foregoing embodiments, the first charge vessel or the second charge vessel can further include a safety valve configured to relive excess pressure in the first charge vessel or second charge vessel, respectively. In any of the foregoing embodiments, the first charge gas valve or second charge gas valve can be fluidically connected to a charge gas pressure regulator configured to deliver a target charge gas pressure, the charge gas pressure regulator being connected to the high pressure gas source. In some embodiments, the high pressure gas source for the first charge vessel and second charge vessel can be the same source. In some embodiments, the high pressure gas source has a higher pressure than the vessel which it is being used to drain. For example, when gas from the first charge vessel is used to fuel at least one engine and is depressurized to the inlet separator, the high pressure gas source need not be as high to discharge the first charge vessel, particularly if a second charge vessel is employed to receive high pressure outputs. As such, in embodiments of the present disclosure, the Joule-Thompson effect caused by the difference between the pressure being used to "push" and the pressure in the vessel being "pushed" can be reduced. This high pressure gas source in any of the foregoing embodiments can be a source in the compressor system chosen from a first interstage scrubber, a second interstage scrubber, a third interstage scrubber or final discharge of the compressor system.

In some embodiments of the present disclosure the environmental emissions and discharge of gas can be minimized or eliminated, thus resulting in no requirement for a mechanism for burnoff. By way of example, but not limitation, where the compressor system is drained into a charge vessel, including a first charge vessel and second charge vessel, and the gas from the first charge vessel is used to fuel at least one engine in the compressor system, no gas emissions are necessary as the gas is consumed as fuel for the at least one engine as opposed to standard practices which include venting compressor liquid drains to atmosphere. Further, in embodiments of the present disclosure, no haul away of liquids may be required as the liquids are flowed into charge vessels which can then be used to flow the liquids to off site tank battery storage.

In any of the foregoing embodiments, the inlet separator, first charge vessel, second charge vessel and fuel filter, to the extent they are present, can all be located on a single skid. In any of the foregoing embodiments, an apparatus can be fluidically connected to two or more compressor systems. In any of the foregoing embodiments, supply gas that is used to operate valves or other devices, such as level controllers, can be fed from any suitable source of supply gas or other gas that is suitable to operate the devices. In any of the foregoing embodiments, additional valves, regulators, sensors, and meters can be added to further control or monitor the system.

Methods of the present disclosure can include methods of recovering gas lift gas and liquids from production gas that comprise feeding a production gas to an apparatus of the present disclosure. In some embodiments, a method of the present disclosure includes the steps of feeding a production gas to an inlet separator fluidically connected to a first charge vessel configured to receive liquids, the inlet separator being configured to remove liquids from the production gas and deliver the liquids to the first charge vessel and to generate a lift gas, the inlet separator being further fluidically connected to a compressor system comprising at least one engine and configured to deliver gas lift gas to the compressor system, and allowing gas lift gas from the first charge vessel to flow into the at least one engine in the compressor system, the first charge vessel comprising a gas outlet fluidically connected to the at least one engine, the gas lift gas being suitable to operate the at least one engine. In some embodiments, the method can include allowing liquids generated by the compressor system to flow into the first charge vessel via a fluidic connection between a source of the liquids generated by the compressor system. In some embodiments, the liquids are a portion of the liquids generated by the compressor system. In some embodiments, the portion of liquids can include sources chosen from at least one of a fuel filter, an inlet or suction scrubber, an interstage scrubber and an environmental drain of the compressor system. In some embodiments, a second charge vessel is provided and liquids generated by the compressor system are allowed to flow into the second charge vessel via a fluidic connection between the source of the liquids and the second charge vessel. The liquids flowed into the second charge vessel can include a portion of liquids generated by the compressor system such as, by way of example but not limitation, the liquids from a second interstage scrubber of the compressor system. In some embodiments, the methods further include the step of pushing liquid out of the first charge vessel or second charge vessel, if present, using a high pressure gas source from the compressor system such as, by way of example but not limitation, from a first interstage scrubber, a second interstage scrubber, a third interstage scrubber and a final discharge from the compressor system, where the high pressure gas source is fluidically connected to the first charge vessel and second charge vessel, if present. The high pressure gas source is higher than the pressure in the vessel which is to be "pushed."

In some embodiments, a method of the present disclosure includes the steps of feeding a production gas to an inlet separator fluidically connected to a first charge vessel configured to receive liquids, the inlet separator being configured to remove liquids from the production gas and deliver the liquids to the first charge vessel and to generate a lift gas, the inlet separator being further fluidically connected to a compressor system, and allowing liquids generated by the compressor system to flow into the first charge vessel which is fluidically connected to the compressor system. In some embodiments, the method can include allowing gas to flow from the first charge vessel to at least one engine in the compressor system. In some embodiments, the liquids are a portion of the liquids generated by the compressor system. In some embodiments, the portion of liquids can include sources chosen from at least one of a fuel filter, an inlet or suction scrubber, an interstage scrubber and an environmental drain of the compressor system. In some embodiments, a second charge vessel is provided and liquids generated by the compressor system are allowed to flow into the second charge vessel via a fluidic connection between the source of the liquids and the second charge vessel. The liquids flowed into the second charge vessel can include a portion of liquids generated by the compressor system such as, by way of example but not limitation, the liquids from a second interstage scrubber of the compressor system. In some embodiments, the methods further include the step of pushing liquid out of the first charge vessel or second charge vessel, if present, using a high pressure gas source from the compressor system such as, by way of example but not limitation, from a first interstage scrubber, a second interstage scrubber, a third interstage scrubber and a final discharge from the compressor system, where the high pressure gas source is fluidically connected to the first charge vessel and second charge vessel, if present. The high pressure gas source is higher than the pressure in the vessel which is to be "pushed." In some embodiments, the method further includes a step of pumping a portion of liquids from the compressor system to the first charge vessel. In some embodiments, this pumped portion of liquids from the compressor system is an environmental drain of the compressor system or any other liquid source that is under less pressure than the pressure in the first charge vessel. In some embodiments, the pump used can be connected to a higher pressure gas source from the compressor system and can pump the liquids from a drain drum in which they have collected from the compressor system.

In any of the foregoing embodiments, the methods can result in reduced or eliminated gas emissions. In any of the foregoing embodiments, the methods may not include the step of burning gas emissions.

Non-limiting, exemplary gases and their compositions that can be used in the apparati of the present disclosure and which are used in the simulations below are provided in Table 1 below. The composition of methane in the exemplary gases varies from 66% in the richest gas to 82% in the leanest gas sample. The molecular weight for the exemplary samples varies from 20 to 24. The exemplary gas samples also show $CO_2$ content of up to 6.9% and maximum $H_2S$ content of up to 20 ppm which makes the gas generally corrosive.

TABLE 1

Non-limiting, exemplary gases

Quickset Design Gas Composition

| Component | SAMPLE Formula | Case 4 Sta # MM0059 Nov. 17, 2016 | Sta # MM0106 Nov. 17, 2016 | Sta # MM0132 Nov. 17, 2016 | Sta # MM0042 Nov. 17, 2016 | Case 1 & 2 Sta # MM0046 Nov. 17, 201 | Sta # MM0058 Nov. 17, 201 | Case 3 Sta # MM0073 Nov. 17, 2016 | Sta # MM MM0207 Nov. 17, 2016 | Sta # MM0207 Nov. 17, 201 | Sta # Mar. 3, 2017 |
|---|---|---|---|---|---|---|---|---|---|---|---|
| Hydrogen Sulfide | H2S | 0.002 | 0 | 0 | 0 | 0 | 0 | 0 | 0.001 | 0 | 0 |
| Nitrogen | N2N | 2.838 | 2.513 | 3.666 | 2.573 | 2.873 | 4.036 | 5.8 | 4.451 | 3.286 | 2.395 |
| Carbon Dioxide | CO2 | 2.538 | 0.385 | 6.932 | 1.01 | 1.024 | 0.915 | 4.32 | 7.511 | 2.143 | 0.619 |
| Methane | C1 | 66.925 | 68.709 | 70.106 | 69.51 | 67.454 | 67.971 | 82.457 | 69.042 | 73.642 | 70.688 |
| Ethane | C2 | 13.322 | 14.662 | 8.071 | 12.434 | 13.794 | 11.853 | 4.971 | 8.278 | 10.004 | 12.516 |
| Propane | C3 | 8.564 | 8.308 | 6.146 | 8.386 | 8.843 | 8.098 | 1.12 | 6.102 | 6.163 | 8.3697 |
| i-Butane | iC4 | 0.901 | 0.755 | 0.728 | 0.974 | 0.939 | 0.935 | 0.074 | 0.735 | 0.771 | 0.7442 |
| n-Butane | nC4 | 2.791 | 2.407 | 2.315 | 2.956 | 2.875 | 3.276 | 0.325 | 2.059 | 2.164 | 2.5785 |
| i-Pentane | iC5 | 0.619 | 0.598 | 0.63 | 0.646 | 0.627 | 0.751 | 0.129 | 0.344 | 0.605 | 0.663 |
| n-Pentane | nC5 | 0.689 | 0.724 | 0.578 | 0.691 | 0.659 | 0.9 | 0.169 | 0.478 | 0.531 | 0.6635 |
| Hexane Plus | C6+ | 0.811 | 0.939 | 0.828 | 0.82 | 0.912 | 1.265 | 0.635 | 0.799 | 0.691 | 0.5612 |
|  | MW | 24.277 | 23.6349 | 23.8733 | 23.776 | 24.1184 | 24.3 | 19.785 | 23.95 | 22.59 | 23.198 |

An exemplary embodiment of an apparatus of the present disclosure is shown in FIG. 4. The intent of the quickset skid is to separate liquids from the gas, meter and transfer the gas to the adjacent gas compressor skid, and discharge collected liquids from the charge vessel to a remote storage facility. As shown in FIG. 4, production gas is fed to the inlet separator 2 on a gas lift skid 1 from a production gas feed 12. The inlet separator 2 is configured to separate liquids from the production gas to form a gas lift gas. The inlet separator is operatively connected to a level controller 13 that is configured to open the inlet separator level control valve 14 to dump the liquid from the inlet separator to the charge vessel 3 via the inlet separator and compressor drain line 15 when it is in excess of a target liquid level. The level controller 13 is also configured to close the inlet separator level control valve 14 when the liquid level in the inlet separator is below the target liquid level. The inlet separator is also configured with a safety valve 30 to relieve pressure if it exceeds a predetermined level. The charge vessel 3 is similarly equipped with a safety valve 31 to relieve pressure if it exceeds a predetermined level. Gas lift gas produced by the inlet separator can flow along the gas line to the compressor 16 to be recompressed for use as gas lift gas in the well. The compressor system 4 has a fuel gas inlet 17 via which it receives fuel gas from the gas line to the compressor 16. The compressor system 4 can also obtain gas from the charge vessel via the compressor suction line 18 which is equipped with a control valve 19 and can convey gas from the charge vessel 3 to the compressor system 4. Liquids from the compressor system 4, such as from a fuel filter scrubber, an inlet scrubber and interstage scrubbers can be drained to the charge vessel 3 via the compressor system drain line 15 which is also the drain line for the inlet separator. However, liquids from environmental drains in the compressor system 4 are drained via a drain drum line 26 to a drain drum 27 and then pumped by a drain pump 28 connected to an interstage, such as the first interstage, of the compressor system 4 via a fluid connection 29. The fluid connection 29 can also provide supply gas to the charge vessel level controller 23 via a fluid connection 22 and to the control valve 19, control valve 20 and the charge vessel drain valve 24 to operate each valve based on the liquid level in the charge vessel 3. Gas from a high pressure gas source in the compressor system, such as the first or second interstage, can be fed along the a gas line 21 which is equipped with a control valve 20 for pushing liquids out of the charge vessel when the charge vessel drain valve 24 is open and the compressor suction line control valve is closed via the charge vessel drain line 25.

In operation, the apparatus separates liquids from the production gas in the inlet separator 2, the liquids flowing into the charge vessel 3 under level control from the inlet separator 2, while gas lift gas can flow to compressor system 4 for recompression. Liquids generated in the compressor system, with the exception of environmental drains can then flow to the charge vessel 3 with environmental drains being pumped from the drain drum 27 to the charge vessel 3 by the drain pump 28 which is powered by gas from an interstage of the compressor system 4. When the level of liquid in the charge vessel 3 exceeds a predetermined limit, the charge vessel level controller 23 can close the compressor suction line control valve 19 and open the charge vessel drain valve 24 and gas line control valve 20 to allow high pressure gas from the compressor system 4 to push the liquid out of the charge vessel 3. When the level of liquid in the charge vessel is below a predetermined limit, the level controller 23 can open the compressor suction line control valve 19 and close the charge vessel drain valve 24 and gas line control valve 20. The dumped liquids can then be fed along the charge vessel drain line 25 to the wellhead or tank battery.

In FIG. 4, the gas flow rate from the inlet separator 2 can be metered by the origice meter on the outlet gas and transmitted by the flow transmitter 77. By way of example, but not limitation, the metered gas flow rate can typically vary from 0.25 MMSCFD to 2.0 MMSCFD. Flow transmitter signal from the flow transmitter 77 can be used to control the compressor suction valve on the adjacent skid. The flow transmitter signal can also be sent to a remote monitoring station via wireless communication provisions.

The liquids from the inlet separator 2 can be under level control and can be discharged to the charge vessel 3 for subsequent transfer to a remote storage facility. Since liquids will typically condense in the inlet flow line from the production facility intermittent slugs may arrive at the inlet separator 2. A level gauge can be provided on both inlet and charge vessels.

Pressure in the inlet separator can, by way of example but not limitation, vary between 15 PSIG and 250 PSIG depending on supply rates from remote production facility and also the downstream compressor discharge capacity to the gas lift wells. At high operating pressure in the inlet separator, gas can be relieved to atmosphere from the safety valve 30 which can be set, by way of example but not limitation, at 275 PSIG.

The pressure in the charge vessel 3 would be set by the operating pressure in the compressor suction scrubber as both vessels share a common header and will normally equalize at the same operating pressure. While liquids are being displaced with utility gas the pressure in the charge vessel 3 will increase, by way of example but not limitation, to approximately 180 PSIG. During this operation, the compressor inlet scrubber can be be isolated from the high pressure in the scrubber with closure of level valve 19.

All liquid lines on the skid can be insulated and heat traced.

Table 2 below provides an exemplary set point register for controllers on the quickset set.

TABLE 2

Exemplary Set Point Register

| Tag No: | Lower Range | Upper Range | Set Point | Unit |
|---|---|---|---|---|
| LC-101 (13 in FIG. 4) | 0 | 24 | 16 | inches |
| LC-102 (23 in FIG. 4) | 0 | 24 | 16 | inches |
| PC-102A (81 in FIG. 4) | 0 | 250 | 180 | PSIG |
| PC-102B (82 in FIG. 4) | 0 | 250 | 50 | PSIG |

Exemplary specifications of the embodiment shown in FIG. 4 are provided in Table 3 below.

TABLE 3

Exemplary specification for Apparatus of FIG. 4

| | DESIGN DESCRIPTION |
|---|---|
| Inlet Separator | Operating Pressure - 15 psi-250 Psi Flow - .250-2.0 MMSCFD Gas Composition - (see Table 1) |
| Gas Metering | Inlet Meter or Meters Built To American Gas Association and American Petroleum Institute standards governed by AGA Repor tNumber 3, Part 2 (API 14.3, Part 2). Tube Operating Pressure 15 psi-250 Psi Flow .250-2.0 MMSCFD Gas Analysis (see Table 1) Daniel Simplex Fitting Block & Bypass Capability EFM Total flow EFM/Battery/Solar Panel capable of wireless communication (RS 485) of flow/pressure data with control functionality so that to control an actuated suction control valve based off a pressure set point. |
| Charge Vessel | Vessel capable of receiving and automatically blow casing fluids to customers poly flow line from tubing of well to offsite tank battery (CTB) from the following, Compressor Skid Drains (Pumped via diaphragm pump) 60 psi max Inlet Separator 15 psi-250 Psi |
| Gas from Inlet Separator will discharge to Adjacent Compressor Skid. Liquids will return from interstage scrubber to Charge Vessel. | Compressor Operation Inlet Scrubber 15-125 Psi 1st Interstage Scrubber 100-450 psi 2nd Interstage Scrubber 200-600 psi Fuel Gas Filter Scrubber 50-150 psi |

The production gases to processed on the quickset skid can have $H_2S$ content which can typically range from 0 to 20 ppm. The current provisions are for venting local discharge to atmosphere. This can include discharge from the safety valve on the inlet separator and charge vessel and periodic blowdown from the compressor on the adjacent compressor skid.

Since $H_2S$ and $CO_2$ gases are both heavier than air, they may concentrate at lower elevation, particularly with conditions of low wind velocity and low temperature in winter months. This could present a safety hazard to personnel at the site. The vent piping from the safety valve and compressor blowdown can be located at sufficient heights to provide good dispersion of the vent gases away from the facility.

A summary of exemplary environmental data for the apparatus in FIG. 4 are provided in Table 4 below.

TABLE 4

Exemplary environmental data for FIG. 4

| ITEM | DESCRIPTION | VALUE | UNITS |
| --- | --- | --- | --- |
| Barometric Pressure | Pressure | 14.7 | PSIA |
| Ambient Temperature | Maximum - Design | 120 | ° F. |
|  | Operation | 20-90 | ° F. |
|  | Minimum Design | −20 | ° F. |
|  | Air Cooler - Design Max. | 100 | ° F. |
| Wind | Design Code | ASCE 7-95 |  |
|  | Design Velocity | 96 | MPH |
|  | Exposure Factor Category |  |  |
|  | Importance Factor | 1.15 |  |
|  | Prevailing Direction | TBD |  |
| Relative Humidity | Design | 75.00% |  |
| Ice/Frost Line, Below Surface | Design |  | Inches |
| Hydrate | Line |  | OF |
| Site Elevation | Design |  | Feet Above MSL |
|  | Design | TBD | Feet Above MSL |
| Rainfall | Annual Average | 20 | Inches |
|  | Monthly - Max. | 25 | Inches |
|  | 24 Hour - 25 Yr Max. | 1 | Inches |
|  | 1 Hour - 25 Yr Max | 1 | Inches |
|  | 1 Hour - 10 Yr. MAX | 1.25 | Inches |
| Snowfall | Annual Average | 3 | Inches |
| Seismic |  |  |  |

A summary of exemplary design conditions is provided in Table 5 below.

TABLE 5

Exemplary Design Conditions

| Inlet Separator | |
| --- | --- |
| Size | 2'-0" OD × 10'-0" T/T |
| Design | 275 PSIG @ 120/−20° F. |
| Operation | 20/250 PSIG @ 60° F. |
| Residence time | 4 minutes |
| Charge vessel | |
| Size | 2'-0" OD × 8'-0" T/T |
| Design | 275 PSIG @ 120/−20° F. |
| Operation | 15/200 PSIG @ 260° F. |
| Residence time | 5 minutes |

An exemplary instrument list for FIG. 4 is provided in Table 6 below.

TABLE 6

Instrument List for FIG. 4

| Instrument Tag | Description | Range | Units |
| --- | --- | --- | --- |
| FIT-101 (78) | Gas flow rate from inlet separator V-101. | 0-3.0 | MMSCFD |
| LG-101 (79) | Liquid Level in Separator V-101 | 0-24 | Inches |
| LG-102 (80) | Liquid Level in Separator V-102 | 0-24 | Inches |
| LC-101 (13) | Level controller for separator V-101 |  |  |
| LCV-101 (14) | Level control valve from separator V-101 |  |  |
| LC-102 (23) | Level controller for separator V-102 |  |  |
| LCV-102A (24) | Level control valve from separator V-102 |  |  |
| LCV-102B (19) | Level control valve from separator V-102 |  |  |
| LCV-102C (20) | Level control valve to separator V-102 |  |  |
| TW/TI-101 (85) | Temperature in V-101 | 0-150 | ° F. |
| TW-101A (84) | Temperature downstream V-101 | 0-150 | ° F. |
| PI-101A (83) | Pressure in Inlet separator V-101 | 0-350 | PSIG |
| PI-102 (86) | Pressure in Charge Vessel V-102 | 0-350 | PSIG |
| PCV-102A (81) | Pressurizing Charge vessel gas supply V-102 |  |  |
| PCV-102B (82) | Instrument gas to LC-102 |  |  |
| PSV-101 (30) | Safety valve on Inlet Separator V-101 | set@275 | PSIG |
| PSV-102 (31) | Safety valve on Charge Vessel V-102 | set@275 | PSIG |

The pipe material recommended is carbon steel with 0.125" corrosion allowance. Since Carbon steel will corrode in the atmosphere, a suitable coating system should be applied. No additional corrosion allowance for external corrosion, above the specified corrosion allowance for internal corrosion is required.

The inlet separator and charge vessel can be insulated and heat traced to minimize potential for icing. All liquid lines on the quickset skid can be insulated and heat traced.

Figure 5:
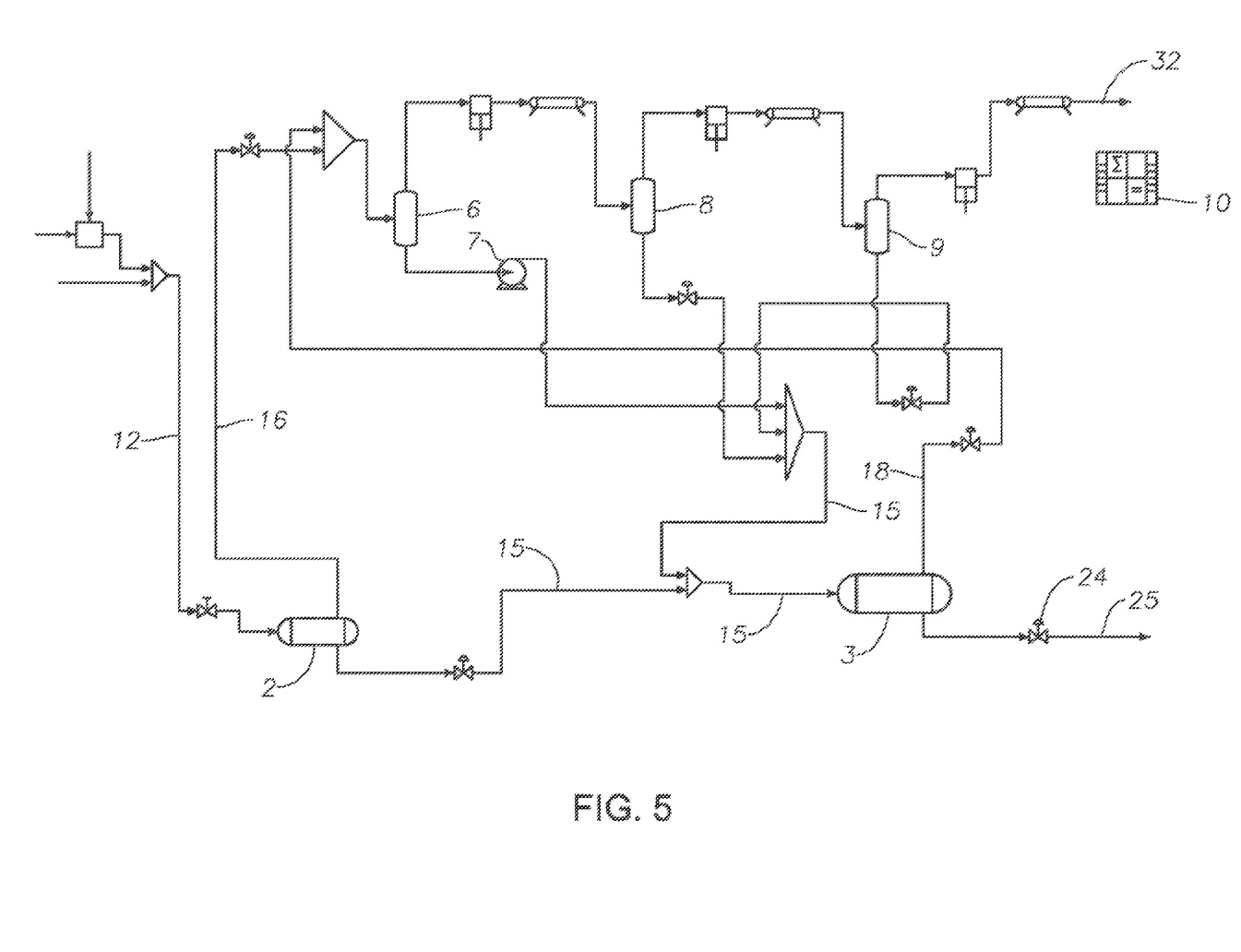
FIG. 5 depicts an exemplary apparatus of the present disclosure.

FIG. 5 shows an apparatus quickset skid setup used for simulations. The apparatus includes the inlet separator 2 which is connected to the charge vessel 3 and configured to deliver liquids to the charge vessel via the drain line 15 which also can drain liquids from the inlet scrubber 6, first interstage scrubber 7 and second interstage scrubber 8 in the compressor system which includes the compressor 10. The liquids from the inlet scrubber are pumped via the pump 7 to the charge vessel 3. The production gas is fed to the inlet scrubber via the feed 12 and gas is conveyed by the gas line to the compressor system 16. The compressor suction line 18 can direct gas from the charge vessel 3 to the compressor system and into the inlet scrubber 6. Recompressed gas from the compressor system can flow to well via piping 32.

Simulations were performed according to the parameters in Table 7 using the apparatus of FIG. 5. The cases considered would cover the worst design condition anticipated during normal operation. The inlet feed will normally condense some liquids and up to 5 BWPD nominally is assumed in the feed to the quickset skid. Liquids removal rate from the quickset skid inlet separated and charging vessel are also shown in Table 7. Generally, the colder the inlet operating conditions, the more liquids will be removed from the quickset skid and will be transferred to the remote tank farm storage facility. Up to 94 BPD of liquids will discharge to the tank farm with a low winter operating inlet temperature of 20° F.

TABLE 7

Inlet and Outlet Properties for Simulations

| CASES | DESCRIPTION | Gas Rate (MMSCFD) | Inlet Sep. Oil (BOPD) | Inlet Sep. Water (BWPD) | Charging Water outlet (BLPD) |
|---|---|---|---|---|---|
| 1 | Maximum arrival pressure of 250 PSIG @ 60 F. - Rich gas feed composition using sample #46 | 2 | 20 | 5 | 25.6 |
| 2 | Low arrival pressure of 20 PSIG @ 60 F. - Rich gas feed using sample #46 | 2 | 0 | 5 | 5.7 |
| 3 | Maximum arrival pressure of 250 PSIG @ 60 F. - Lean gas feed composition using sample #73 | 2 | 0 | 5 | 5 |
| 4 | Maximum arrival pressure of 250 PSIG @ 60 F. - Rich gas feed composition using sample #59 | 2 | 16 | 5 | 21 |
| 5 | Maximum arrival pressure of 250 PSIG @ 20 F. - Rich gas feed composition using sample #59 | 2 | 89 | 5 | 94.5 |

For each simulation, the properties for each flow are shown in Table 8 below.

TABLE 8

Temperature, Pressure and Flow Properties for Simulation Cases in Table 7

| Case | Flow Line | Temperature (° F.) | Pressure (psig) | Flow |
|---|---|---|---|---|
| 1 | 12 (feed) | 60.0 | 200.00 | 5264.01 lb/h |
| | 15 (liquid drain from separator) | 59.4 | 195.00 | 25.298 bbl/d |
| | 16 (gas from separator to compressor system) | 59.4 | 195.00 | 1.9772 MMSCFD |
| | 18 (compressor suction line) | 59.1 | 190.00 | 0.1 lb/h |
| | 25 (charge vessel drain line) | 59.2 | 187.00 | 25.676 bbl/d |
| | 32 (line to well) | 120.0 | 1005.00 | 1.9772 MMSCFD |
| 2 | 12 (feed) | 60.0 | 20.00 | 5264.01 lb/h |
| | 15 (liquid drain from separator) | 59.7 | 19.00 | 4.965 bbl/d |
| | 16 (gas from separator to compressor system) | 59.7 | 19.00 | 2.0148 lb/h |
| | 18 (compressor suction line) | 47.5 | 15.00 | 0.00 lb/h |
| | 25 (charge vessel drain line) | 67.5 | 10.00 | 5.700 bbl/d |
| | 32 (line to well) | 120.00 | 2005.0 | 2.0094 MMSCFD |
| 3 | 12 (feed) | 60.0 | 200.00 | 4334.14 lb/h |
| | 15 (liquid drain from separator) | 59.6 | 195.00 | 5.003 bbl/d |
| | 16 (gas from separator to compressor system) | 59.6 | 195.00 | 2.0025 MMSCFD |
| | 18 (compressor suction line) | 59.6 | 178.00 | 0.00 lb/h |
| | 25 (charge vessel drain line) | 59.7 | 175.00 | 5.001 bbl/d |
| | 32 (line to well) | 120.0 | 1005.0 | 2.0025 MMSCFD |
| 4 | 12 (feed) | 60.0 | 200.00 | 5318.56 lb/h |
| | 15 (liquid drain from separator) | 59.4 | 195.00 | 20.933 bbl/d |
| | 16 (gas from separator to compressor system) | 59.4 | 195.00 | 1.9826 MMSCFD |
| | 18 (compressor suction line) | 59.1 | 190.00 | 0.08 lb/h |
| | 25 (charge vessel drain line) | 59.2 | 187.00 | 21.243 bbl/d |
| | 32 (line to well) | 120.0 | 1005.00 | 1.9826 MMSCFD |
| 5 | 12 (feed) | 20.0 | 200.00 | |
| | 15 (liquid drain from separator) | 19.3 | 195.00 | 94.689 bbl/d |
| | 16 (gas from separator to compressor system) | 19.3 | 195.00 | 2.1794 MMSCFD |
| | 18 (compressor suction line) | 19.0 | 190.00 | 0.46 lb/h |
| | 25 (charge vessel drain line) | 19.0 | 187.00 | 94.589 bbl/d |
| | 32 (line to well) | 120.0 | 1005.00 | 2.1796 MMSCFD |

The compressor power for each case is shown in Table 9 below.

TABLE 8

Compressor Power Requirements for Simulation Cases in Table 7

| Case | 1st Stage Power | 2nd Stage Power | 3rd Stage Power | Total Power (hp) |
|---|---|---|---|---|
| 1 | 69.51 | 60.63 | 57.29 | 187.43 |
| 2 | 158.69 | 164.87 | 119.85 | 443.41 |
| 3 | 89.35 | 84.63 | 63.01 | 236.99 |
| 4 | 69.68 | 60.78 | 57.40 | 187.87 |
| 5 | 91.20 | 52.36 | 53.87 | 197.44 |

Figure 6A:
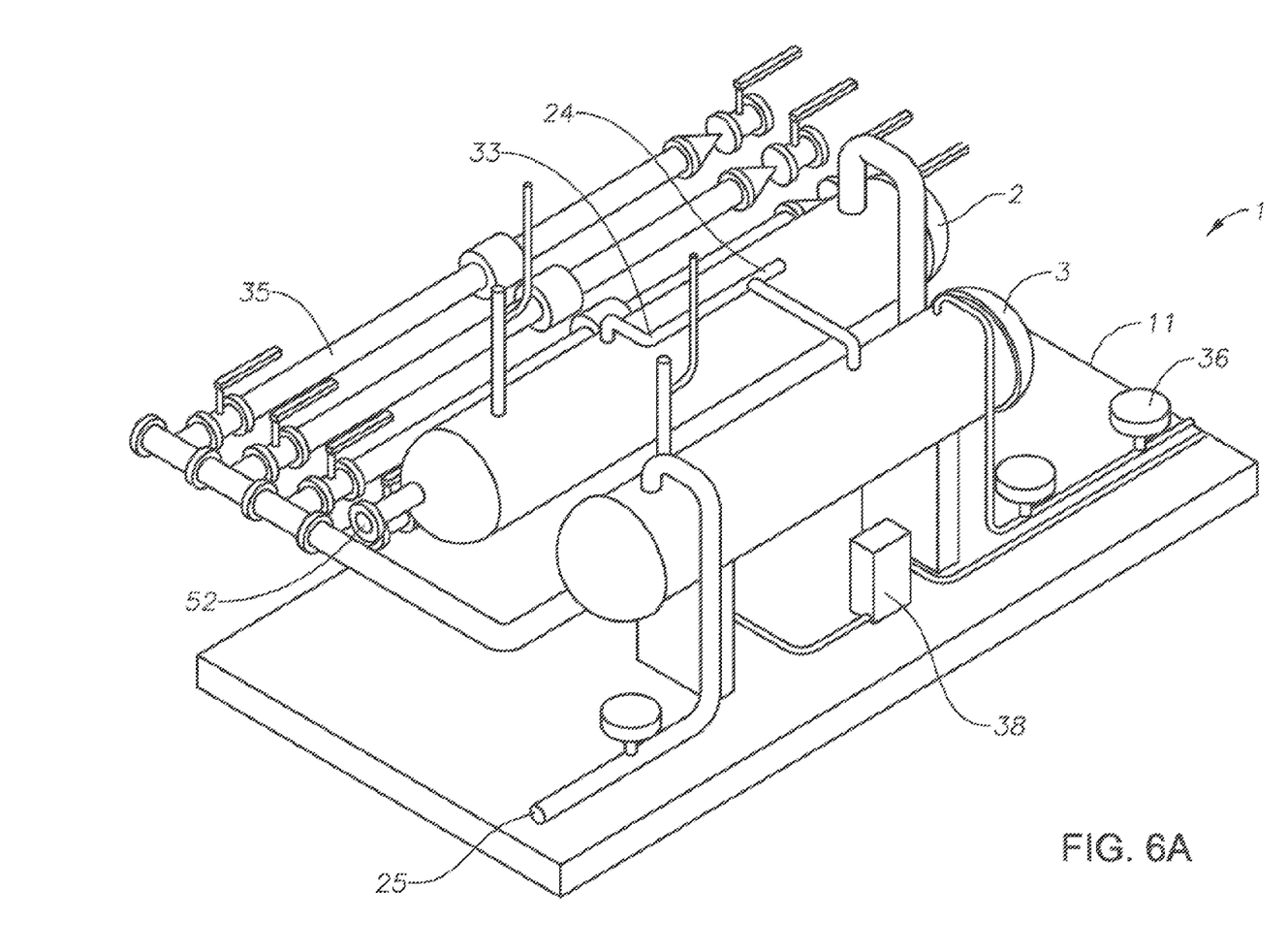
FIG. 6A depicts a front perspective view of an exemplary apparatus of the present disclosure.
Figure 6B:
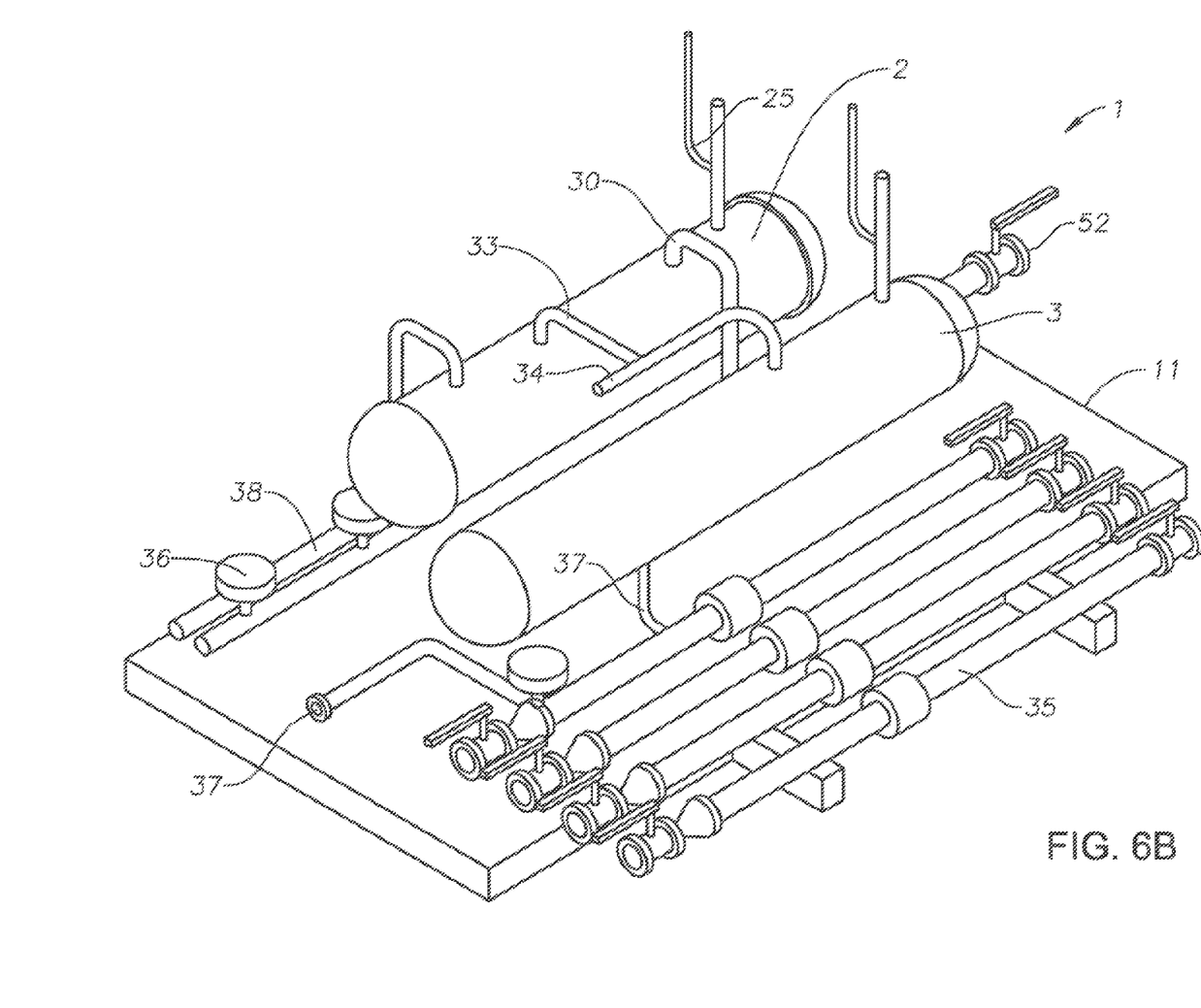
FIG. 6B depicts a rear perspective view of the exemplary apparatus of FIG. 6A.

As shown in FIGS. 6A and 6B, which depict another embodiment of the gas lift skid 1, the apparatus includes an inlet separator 2 and a charge vessel 3 on a skid 11. The inlet separator 2 receives gas from an off-site central tank battery or pipeline at the inlet 52. The charge vessel 3 has a charge gas liquid outlet 25 to well stream flow line to central tank batter. HP de pressure line 33 is between the inlet separator 2 and charge vessel 3. LP de pressure line 24 is connected to pressure line 33 to connect to engine fuel gas, compressor suction or atmosphere. Compressor suction meters 35 are also mounted on the skid 11. The charge vessel 3 has an HP charge gas inlet 36 from first interstage, second interstage, third interstage, or final discharge from the compressor. The charge vessel 3 further has an HP liquid inlet 37 and a LP liquid inlet 38 pumped via diaphragm or electric pump.

Another exemplary apparatus of the present disclosure is depicted in FIG. 7. As shown in FIG. 7, the apparatus according to another embodiment of a gas lift skid 1 includes an inlet separator 2, a LP charge vessel 50, and a HP charge vessel 51 on a skid. Inlet separator 2 receives gas from offsite central tank battery or pipeline at inlet 52 from the feed 12. Liquids are separated from inlet gas stream and are automatically dumped via inlet separator automatic level controller 13 from inlet separator dump valve 45 through the liquid outlet 54 into LP charge vessel 50 through a liquid inlet 59 on the LP charge vessel 50. Dry gas from inlet separator 2 passes through a gas lift gas outlet 53 then travels through meter or meters 57 to compressor suction via on skid interconnected piping connection 74. Further Meters 57 are equipped with bypass piping. LP charge vessel 50 receives low pressure liquids from on skid interconnected piping connection 58 from the fuel gas scrubber, suction scrubber, first inter stage scrubber, and skid drains of associated gas lift compressor, or any liquids stream with an operating pressure greater than 20 psig. Liquids from LP Charge Vessel 50 are automatically dumped through a liquid outlet 87 via LP charge vessel level control 63 through the LP charge vessel dump valve 40 via interconnected piping to the gas lift skid liquid outlet line 65 to well stream flow line to offsite central tank battery or on-site production tank. LP charge vessel 50 receive high pressure charge gas through LP charge gas valve 46 automatically via output signal from LP charge vessel liquid level controller 63 from first inter stage, second inter stage, or final discharge of associated compressor or alternative high pressure gas source that is greater than well flow line pressure via interconnected on skid piping connection 66 that has an automatic pressure regulator 49. LP charge vessel 50 de pressures to inlet separator 2 through the a gas de pressure outlet 60 via LP charge vessel de pressure valve 42 automatically via output signal from LP charges vessel automatic level controller 63. LP charge vessel 50 further de pressures through a gas outlet 62 via a LP charge vessel fuel line that flows into a gas inlet 69 on a the fuel filter and is filtered via on skid fuel filter 68 that connects to associated compressor engine fuel line via on skid interconnected piping connection 67 and allows gas to flow from the gas outlet 71 on the fuel filter. LP charge vessel 50 fuel line has an automatic fuel gas pressure regulator 48. LP charge vessel fuel line further has an automatic pressure makeup valve 43 from which it supplies fuel gas from inlet separator 2 through a gas make up outlet 55 automatically. LP fuel gas filter 68 has an automatic level controller 72 which automatically introduces higher pressure gas from inlet separator 2 through a gas charge outlet to the fuel filter 56 via output signal to fuel gas filter charge valve 44 allowing fluids to dump into LP charge vessel 50 through the fuel filter liquid outlet 70 via on skid interconnecting piping. The HP charge vessel 51 receives liquids from the associated first and/or second inter stage compressor scrubbers or alternative liquid source that has an operating pressure greater than the well flow line pressure via on skid interconnecting piping connection 73 through the liquid inlet 75 of the HP charge vessel. Liquids from HP charge vessel 51 are automatically dumped via HP charge vessel level control 64 through the HP charge vessel dump valve 41 out of the liquid outlet 76 of the HP charge vessel via interconnected piping to the gas lift skid liquid outlet line 65 to well stream flow line to offsite central tank battery or an onsite production tank. HP charge vessel 51 receives high pressure charge gas through HP charge gas valve 47 automatically via output signal from HP charge vessel liquid level controller 64 from first inter stage, second inter stage, or final discharge of associated compressor via interconnected on skid piping connection 66 that has an automatic pressure regulator 49. The HP charge vessel separator 51 further has an automatic controlled pressure regulating valve 39 connected to relieve excess gas pressure to the inlet separator 2.

It should be understood that the foregoing description provides embodiments of the present invention which can be varied and combined without departing from the spirit of this disclosure. To the extent that the different aspects disclosed can be combined, such combination are disclosed herein.

Those of skill in the art should, in light of the present disclosure, appreciate that many changes can be made in the specific embodiments which are disclosed and still obtain a like or similar result without departing from the concept, spirit and scope of the present disclosure.

What is claimed is:

1. A gas lift gas recovery system comprising:
   an inlet separator for receiving production gas and separating out gas lift gas from entrained fluids to provide recovered gas lift gas; and
   a vessel system arranged for selective connection to receive entrained fluids from the inlet separator, the vessel system comprising:
      a charge vessel for holding fluids, the charge vessel including an inlet for receiving fluids from the inlet separator, a liquid outlet for expelling liquid from the charge vessel under force of high pressure gas, and a gas pressure outlet for selective providing gas for compression; and
      a charge gas valve configured for selective operation to connect a high pressure gas source to deliver high pressure gas to encourage expelling fluids from the vessel system.

2. The gas lift gas recovery system of claim 1, further comprising a second liquid inlet configured to be fluidically connected to a compressor system.

3. The gas lift gas recovery system of claim 1, wherein the high pressure gas source is a gas lift gas compressor system configured to compress recovered gas lift gas from the inlet separator.

4. The gas lift gas recovery system of claim 1, further comprising a charge gas pressure regulator fluidically connected with the charge gas valve, the charge gas pressure regulator being configured to be fluidically connected to the high pressure gas source between the high pressure gas source and the charge gas valve, the charge gas pressure regulator being configured to deliver a target charge gas pressure.

5. The gas lift gas recovery system of claim 1, further comprising at least one level controller for monitoring liquid level within at least one of the inlet separator and the charge vessel.

6. The gas lift gas recovery system of claim 1, wherein the charge vessel of the vessel system includes a high pressure (HP) vessel portion and the low pressure (LP) vessel portion.

7. The gas lift gas recovery system of claim 6, wherein the LP vessel portion is configured to receive LP fluids from a compressor system.

8. A gas lift gas preparation system, comprising:
   a gas lift gas compressor system; and
   the gas lift gas recovery system of claim 1.

9. The gas lift gas recovery system of claim 8, further comprising a second liquid inlet configured to be fluidically connected to the gas lift gas compressor system.

10. The gas lift gas recovery system of claim 8, wherein the high pressure gas source is the gas lift gas compressor system configured to compress recovered gas lift gas from the inlet separator.

11. The gas lift gas recovery system of claim 8, further comprising a charge gas pressure regulator fluidically connected with the charge gas valve, the charge gas pressure regulator being configured to be fluidically connected to the high pressure gas source between the high pressure gas source and the charge gas valve, the charge gas pressure regulator being configured to deliver a target charge gas pressure.

12. The gas lift gas recovery system of claim 8, further comprising at least one level controller for monitoring liquid level within at least one of the inlet separator and the charge vessel.

13. The gas lift gas recovery system of claim 8, wherein the charge vessel of the vessel system includes a high pressure (HP) vessel portion and the low pressure (LP) vessel portion.

14. A method for recovering gas lift gas, comprising:
   providing a system according to claim 8,
   allowing a portion of high pressure liquids generated by a gas lift gas compressor system to flow into the charge vessel, wherein the charge vessel is fluidically connected to a source of the portion of high pressure liquids generated by the gas lift gas compressor system;
   allowing a portion of low pressure liquids into the charge vessel; and
   providing gas within the charge vessel to the inlet separator.

\* \* \* \* \*